Figure 1:
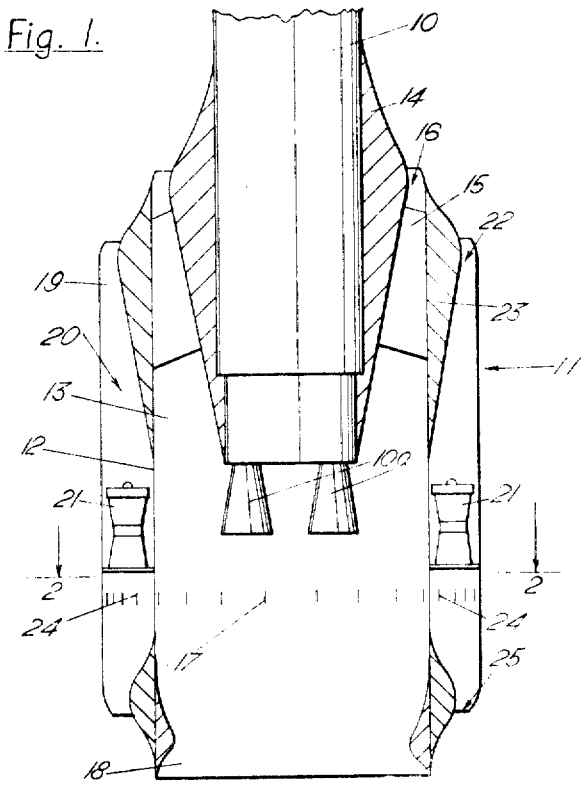

Nov. 15, 1966    J. G. KEENAN    3,285,175
VEHICLE FOR LAUNCHING ROCKET PROPELLED VEHICLES
Filed Nov. 30, 1964    3 Sheets-Sheet 1

Inventor
JOHN GREGORY KEENAN

By
Cushman, Darby & Cushman
Attorneys

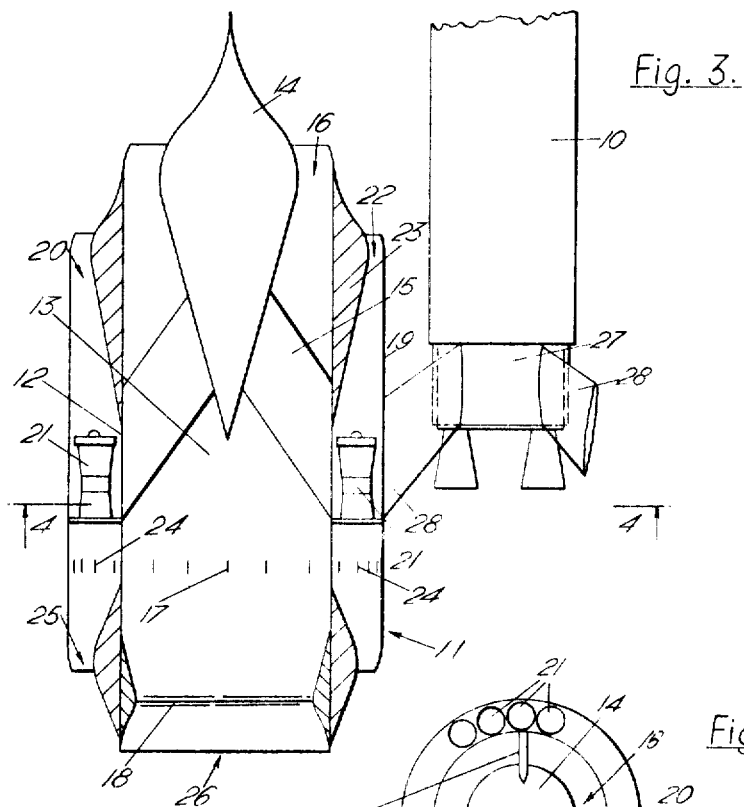
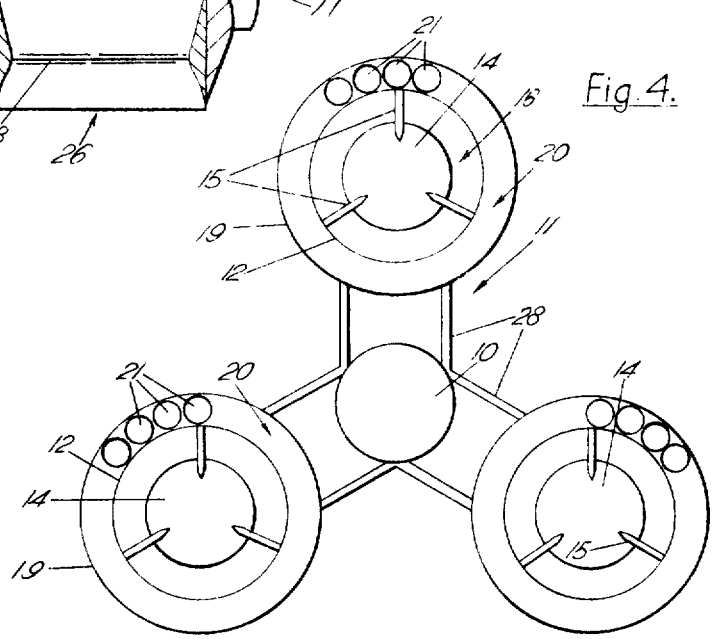

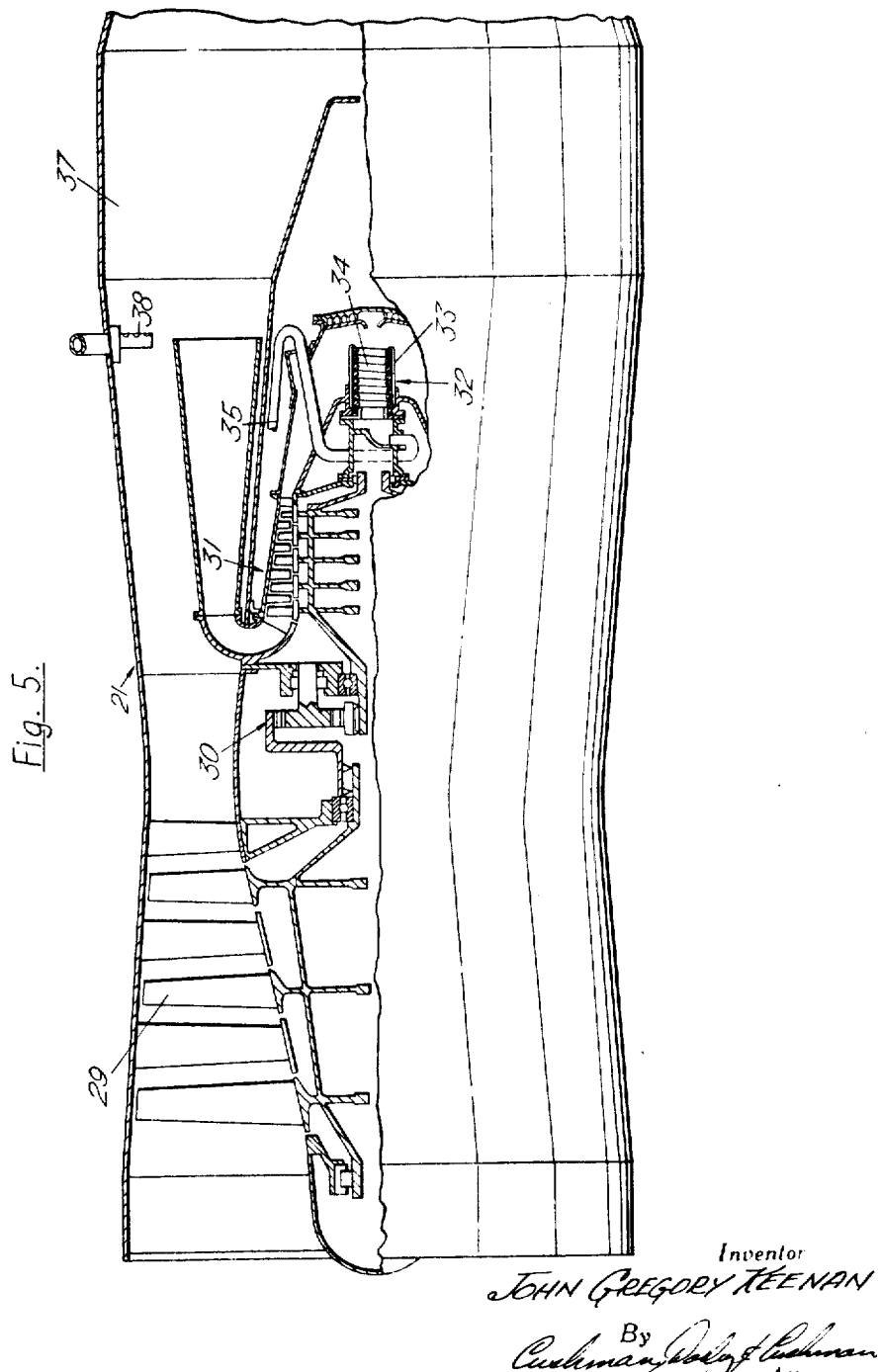

United States Patent Office 3,285,175
Patented Nov. 15, 1966

3,285,175
VEHICLE FOR LAUNCHING ROCKET
PROPELLED VEHICLES
John Gregory Keenan, Derby, England, assignor to
Rolls-Royce Limited, Derby, England
Filed Nov. 30, 1964, Ser. No. 414,591
Claims priority, application Great Britain, Dec. 6, 1963,
48,385/63
7 Claims. (Cl. 102—49)

This invention relates to vehicles adapted to propel a rocket propelled vehicle upwards, said rocket propelled vehicle being adapted to be launched from said vehicle.

With rockets which are launched from the ground by rocket motors the payload which these rockets can put into orbit around the earth is a very small fraction of the total launch weight. One cause of this is that with rocket engines the rocket has to carry its own oxidant as well as fuel and a very large quantity of this oxidant and fuel is used in lifting the rocket through the earth's atmosphere.

It has been found that the payload which can be put into orbit can be a larger proportion of the total rocket weight if the rocket is propelled to the upper atmosphere by a separate vehicle before being launched.

According to the present invention there is provided a wingless vehicle adapted to propel a rocket propelled vehicle vertically or near vertically upwards, said rocket propelled vehicle being adapted to be launched from said wingless vehicle, said wingless vehicle including at least two different types of air-breathing engines, or one or more engines capable of operating in at least two different modes.

Preferably, the said different types of air-breathing engines comprises tubo-jet, turbo-rocket or ram-jet engines, and the said one or more engines capable of operating in at least two different modes may operate as turbo-jet, turbo-rocket or ram-jet engines.

The air-breathing engines can comprise at least one ram-jet engine surrounded by turbo-jet and/or turbo-rocket engines.

In preferred arrangements the rocket propelled vehicle is disposed in the centre of the wingless vehicle.

The wingless vehicle can comprise a single ram-jet engine which surrounds the body of the rocket propelled vehicle and the ram-jet engine is surrounded by a number of turbo-rocket engines.

Alternatively, the wingless vehicle may include two or more ram-jet engines equi-angularly disposed around the rocket propelled vehicle and connected to the rocket vehicle by fins or struts, each of said ram-jet engines being surrounded by a number of turbo-rocket engines.

Preferably, the or each ram-jet engine is surrounded by an annular space in which are disposed the turbo-jet and/or turbo-rocket engines.

The wingless vehicle is preferably disposed at the rear end of the rocket propelled vehicle.

Figure 2:
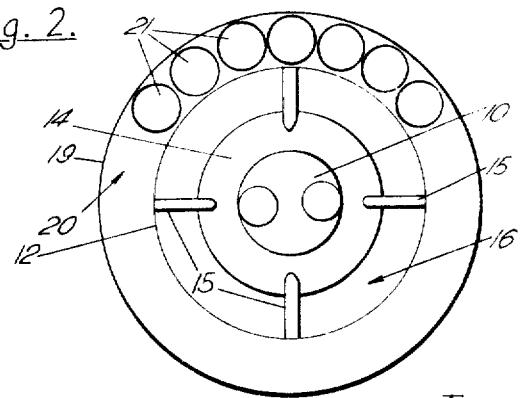

Two embodiments of the present invention will now be described with reference to the accompanying drawings in which:

FIGURE 1 is a longitudinal section through one embodiment of a wingless vehicle showing part of the rocket propelled vehicle, FIGURE 2 is a transverse section taken on the line 2—2 indicated on FIGURE 1, FIGURE 3 is a longitudinal section through part of an alternative embodiment of wingless vehicle, FIGURE 4 is a transverse section taken on the line 4—4 indicated on FIGURE 3, and FIGURE 5 is a longitudinal section through a turbo-rocket engine which may be used in the embodiment shown in FIGURES 1 to 4.

In the embodiment shown in FIGURES 1 and 2 a rocket propelled vehicle 10 is supported in the centre of a wingless vehicle 11 which can propel the rocket vehicle 10 vertically or near vertically upwards to the upper atmosphere before the rocket propelled vehicle 10 is launched from the wingless vehicle 11. It will be appreciated that as the rocket propelled vehicle does not have to carry oxidant and fuel for this part of its journey then the payload can be a larger proportion of the total rocket weight.

The wingless vehicle 11 surrounds the lower end of the rocket propelled vehicle 10 and comprises an annular wall 12 which is radially spaced from the rocket propelled vehicle 10 and extends below the end of the vehicle 10. The duct 13 formed by the wall 12 is provided with a centrally disposed fairing member 14 which is supported from the annular wall 12 by a number of struts 15. The outer surface of the fairing member 14 is divergent and then convergent in the direction of air-flow and forms with the inner surface of the annular wall 12 an air-intake 16. Disposed within the duct 13 are a number of fuel burners which are shown diagrammatically at 17. The lower end of duct 13 is provided with a propulsion nozzle 18.

Surrounding the annular wall 12 and radially spaced therefrom is an annular wall 19 which together with the annular wall 12 defines an annular space 20 in which are disposed a number of turbo-rocket engines 21, of which only seven are shown in FIGURE 2, each of which receive air from an air-intake 22 formed between a divergent/convergent fairing member 23 which forms the upper part of the annular wall 12 and the inner surface of the annular wall 19. The turbo-rocket engines 21 are provided with fuel burners 24 as hereafter described with reference to FIGURE 5 and the hot propulsive gases pass to atmosphere through a propulsion nozzle 25.

In order to propel the wingless vehicle 11 and rocket propelled vehicle 10 vertically from the ground the turbo-rocket engines 21 are started and they receive air through the air-intake 22, the hot gases being exhausted to atmosphere through the propulsion nozzle 25. As the wingless vehicle 11 and rocket propelled vehicle 10 increase in velocity atmospheric air will be forced through the air-intake 16 and at a predetermined velocity of the wingless vehicle 11 the fuel burners 17 will be brought into operation so that the duct 13 acts as a ram-jet engine.

When the wingless vehicle 11 reaches a predetermined height, rocket motors 10a of the rocket propelled vehicle 10 are brought into operation and the rocket is automatically detached from the wingless vehicle 10 which is then decellerated and returned to earth by controlling the power produced by the ram-jet engine and turbo-rocket engines 21.

It will be appreciated that the engines 21 may be any form of air-breathing engine, for example they may be turbo-jet engines with or without means for reheating the hot gases or they may each comprise a convertible engine which is capable of converting from turbo-jet operation to ram-jet operation such as forms the subject of the United States application of John Gregory Keenan, Jack Palfreyman and John Bertram Holliday, Serial Number 328, 659, filed December 6, 1963, and having the same assignee as the instant case.

As the engines which propel the wingless vehicle 11 vertically upwards are air-breathing engines the vehicle 11 need only carry fuel as the oxygen is drawn from the air through which it passes.

In the embodiment shown in FIGURES 3 and 4 the wingless vehicle 11 comprises three ram-jet engines 26, equi-angularly disposed about the rocket propelled vehicle 10, each of which operates in the same manner as the ram-jet engine shown in FIGURES 1 and 2 and parts which are identical to those shown in FIGURES 1 and 2 have the same reference numerals applied thereto.

Each ram-jet engine 26 and annulus 19 containing the turbo-rocket engines 21 are connected to a member 27, which is detachably secured and the lower end of the rocket propelled vehicle 10, by fins 28.

FIGURE 5 shows an example of a turbo-rocket 21 and this comprises a low-pressure compressor 29 which is driven through reduction gearing 30 by a small multi-stage turbine 31. The turbine 31 is driven by gas fed from a rocket-type combustion chamber 32 which burns fuel with liquid oxygen. The rocket type combustion chamber 32 comprises a helically coiled pipe 33 which receives hydrogen and feeds it into the chamber 34 formed by the pipe 33. Oxygen is also fed into the chamber 34 through a conduit 35. The combustion gases which are rich in hydrogen are fed to the turbine 31 to drive it and are then passed through chutes 36 into a jet pipe 37 where the combustion gases are mixed with additional fuel from injectors 38 and the air compressed by the low-pressure compressor 29 and burned at the burners 24 shown in FIGURE 1.

This type of turbo-rocket engine is known and an example has been disclosed at page 70 of Flight International published May 16th, 1963.

The wingless vehicles 11 disclosed propel the rocket-propelled vehicles 10 vertically or near vertically upwards and consequently the flight path through the atmosphere is less than a winged vehicle which relies on the wings for some aerodynamic lift and consequently follows a flight path which is long. It will be appreciated that as the flight of a wingless vehicle is less than that of a winged vehicle the amount of heat generated in passing through the atmosphere will also be less.

What I claim is:
1. A wingless vehicle for substantially vertical flight comprising:
   an annular shaped body member having an outer wall and an inner wall spaced from each other by an annulus, the annulus defining an annular air duct with an intake at one end thereof and a propulsion nozzle at the other end thereof;
   a plurality of thrust-producing engines positioned within said annular air duct;
   a center body member;
   a plurality of struts supporting said center body member on the axis of said annular body member in spaced relationship to the inner wall of the annular body member thereby defining an annular ram air duct having an intake at one end thereof and a propulsion nozzle at the other end thereof; and
   fuel injectors positioned within the annular ram air duck and spaced radially around the same for supplying fuel to be mixed with and burned with ram air.

2. A wingless vehicle as claimed in claim 1 wherein said thrust producing engines are turbo-jet engines.

3. A wingless vehicle as claimed in claim 1 wherein said thrust producing engines are convertible engines from turbo-jet operation to ram-jet operation and vice versa.

4. A wingless vehicle as claimed in claim 1 wherein said thrust producing engines are turbo-rocket engines.

5. In combination: a rocket propelled vehicle having an elongated generally cylindrical body; and
   a wingless vehicle for detachably supporting said rocket-propelled vehicle adjacent the rocket-propelled vehicle's rear end, said wingless vehicle comprising an annular shaped body member having an outer wall and an inner wall spaced from each other by an annulus which defines an annular air duct having an intake at one end thereof and a propulsion nozzle at the other end thereof, a plurality of thrust producing engines positioned within said annular air duct, a center body member, a plurality of struts supporting said center body member on the axis of said annular body member in spaced relationship to the inner wall of the annular body member thereby defining an annular ramjet air duct having an intake at one end and a propulsion nozzle at the other end thereof, and fuel injectors positioned in and spaced radially around the annular ramjet air duct for supplying fuel to be mixed with and burned with ram air; and
   means for detachably supporting the rocket-propelled vehicle by the wingless vehicle.

6. The combination as claimed in claim 5 wherein said last mentioned means is the center body of said wingless vehicle, said center body being annular for receiving the rear end of the rocket-propelled vehicle.

7. The combination as claimed in claim 5 wherein said last mentioned means includes the plurality of said wingless vehicles equally spaced around said rocket-propelled vehicle, each of said wingless vehicles having a strut projecting radially outwardly from the outer wall of its annular body member and radially inwardly relative the rocket-propelled vehicle, said struts of said plurality of wingless vehicles being arranged to support said rocket-propelled vehicle at their outer ends on an axis parallel to the axes of the wingless vehicle.

References Cited by the Examiner
UNITED STATES PATENTS

| 2,973,921 | 3/1961 | Price | 60—35.6 |
|---|---|---|---|
| 2,977,080 | 3/1961 | Zborowski. | |
| 3,000,593 | 9/1961 | Eggers et al. | 244—2 |
| 3,092,027 | 6/1963 | Price | 102—49 |

SAMUEL FEINBERG, *Primary Examiner.*

BENJAMIN A. BORCHELT, *Examiner.*

V. R. PENDEGRASS, *Assistant Examiner.*